(12) United States Patent (10) Patent No.: US 9,165,352 B2
Wu et al. (45) Date of Patent: Oct. 20, 2015

(54) PRECIPITATION REMOVAL FOR VISION-BASED PARKING MANAGEMENT SYSTEMS

(71) Applicant: XEROX CORPORATION, Norwalk, CT (US)

(72) Inventors: Wencheng Wu, Webster, NY (US); Edul N. Dalal, Webster, NY (US); Orhan Bulan, Ankara (TR)

(73) Assignee: Xerox Corporation, Norwalk, CT (US)

( * ) Notice: Subject to any disclaimer, the term of this patent is extended or adjusted under 35 U.S.C. 154(b) by 48 days.

(21) Appl. No.: 13/913,606

(22) Filed: Jun. 10, 2013

(65) Prior Publication Data

US 2014/0363045 A1 Dec. 11, 2014

(51) Int. Cl.
*G06T 5/50* (2006.01)
*G06T 5/00* (2006.01)

(52) U.S. Cl.
CPC . *G06T 5/50* (2013.01); *G06T 5/002* (2013.01); *G06T 2207/10016* (2013.01); *G06T 2207/20032* (2013.01); *G06T 2207/20182* (2013.01); *G06T 2207/20224* (2013.01); *G06T 2207/30232* (2013.01); *G06T 2207/30236* (2013.01)

(58) Field of Classification Search
CPC .... B60S 1/0833; G06K 9/00791; G06K 9/40; G06T 2207/30252; G06T 2207/10016; G06T 7/2053; G06T 5/50; G06T 1/0007; G06T 2207/30242; G06T 7/2006; B60R 21/01538; G05D 2201/0213
USPC ........................... 382/103, 107, 220, 221, 224
See application file for complete search history.

(56) References Cited

U.S. PATENT DOCUMENTS

| 5,444,530 | A | 8/1995 | Wang |
| 6,032,004 | A | 2/2000 | Mirabella, Jr. et al. |
| 6,097,024 | A | 8/2000 | Stam et al. |
| 8,305,447 | B1 | 11/2012 | Wong |
| 2006/0008118 | A1* | 1/2006 | Matsuoka et al. ............ 382/103 |
| 2007/0047809 | A1* | 3/2007 | Sasaki ........................... 382/170 |
| 2007/0053671 | A1* | 3/2007 | Garg et al. ..................... 396/77 |

(Continued)

FOREIGN PATENT DOCUMENTS

JP 09-214940 5/1997

OTHER PUBLICATIONS

U.S. Appl. No. 13/441,269, filed Apr. 6, 2012; Bulan et al; Video-based Method for Detecting Parking Boundary Violations.

(Continued)

*Primary Examiner* — Vu Le
*Assistant Examiner* — Kenny Cese
(74) *Attorney, Agent, or Firm* — Gibb & Riley, LLC

(57) ABSTRACT

Methods and systems receive a series of images and compare at least two of the images in the series of images to locate items that are in different positions to identify moving items. Such methods and systems further calculate a measure of the moving items within the series of images. Additionally, such methods and systems perform a continuously variable image correction to remove the moving items from the images to produce a series of corrected images. This "continuously variable image correction" increases the amount of image correction for a relatively higher measure of the moving items and decreases the amount of image correction for a relatively lower measure of the moving items, and does so continuously as the measure of the moving items changes within the series of images.

18 Claims, 6 Drawing Sheets

(56) References Cited

U.S. PATENT DOCUMENTS

| | | | |
|---|---|---|---|
| 2009/0016636 A1 | 1/2009 | Kasashima et al. | |
| 2011/0090351 A1* | 4/2011 | Cote et al. | 348/208.1 |
| 2012/0236184 A1* | 9/2012 | Jia et al. | 348/241 |
| 2013/0030685 A1 | 1/2013 | Goetting | |

OTHER PUBLICATIONS

U.S. Appl. No. 13/461,266, filed May 1, 2012; Bulan et al; Video-based Method for Detecting Parking Boundary Violations (CIP).

U.S. Appl. No. 13/461,221, filed May 1, 2012; Bulan et al; Video-based Method for Detecting Parking Boundary Violations (CIP1).

U.S. Appl. No. 13/441,294, filed Apr. 6, 2012; Bernal et al; Smartphone Augmented Video-based On-street Parking Management System.

U.S. Appl. No. 13/461,191, filed May 1, 2012; Wang et al; Smartphone Augmented Video-based On-street Parking Management System (CIP).

U.S. Appl. No. 13/461,161, filed May 1, 2012; Fan et al; Smartphone Augmented Video-based On-street Parking Management System (CIP1).

U.S. Appl. No. 13/441,253, filed Apr. 6, 2012; Bulan et al; A Video-based System and Method for Detecting Exclusion Zone Infractions.

U.S. Appl. No. 13/684,817, filed Nov. 26, 2012; Wang et al; System and Method for Estimation of Available Parking Space Through Intersection Traffic Counting.

U.S. Appl. No. 13/836,310, filed Mar. 15, 2013; Wu et al; Methods and System for Automated In-field Hierarchical Training of a Vehicle Detection System.

U.S. Appl. No. 13/835,386, filed Mar. 15, 2013; Bulan et al; Two-dimensional and Three-dimensional Sliding Window-based Methods and Systems for Detecting Vehicles.

Zhen Jia et al, "A Two-Step Approach to See-Through Bad Weather for Surveillance Video Quality Enhancement," 2011 IEEE International Conference on Robotics and Automation Shanghai International Conference Center, May 9-13, 2011, Shanghai, China, pp. 5309-5314 (2011).

S. Battiato et al, "An Efficient Algorithm for the Approximate Median Selection Problem," Algorithms and Complexity (2000): 226-238 (Abstract).

* cited by examiner

PRECIPITATION REMOVAL FOR VISION-BASED PARKING MANAGEMENT SYSTEMS

BACKGROUND

Systems and methods herein generally relate to vision-based parking management systems and more particularly to vision-based parking management systems that are used in environments that can experience items that occasionally interfere with obtaining clear images, such as precipitation of rain or snow.

Video-based technology for parking management systems is more extensible to additional functions compared to in-ground metal sensors or ultra-sonic sensors. The additional functions provided by video-based technology bring significant revenue to cities and other municipalities. However, performance of video-based parking management systems can be impacted by weather conditions, such as rain or snow.

SUMMARY

An exemplary optical-based vehicle parking control system herein includes, in addition to other components, a camera device acquiring a series of images and a computerized device operatively (meaning directly or indirectly) connected to the camera device. The computerized device compares at least two different images in the series of images to locate items that are in different positions in the different images to identify precipitation (snow, rain, etc.) within the series of images, and to locate items that are in the same position in the images (to, for example, identify parked vehicles). For example, the computerized device can limit the calculation of the amount of precipitation to items that are moving within a previously determined speed range. The computerized device then calculates the amount of precipitation within the series of images. For example, the computerized device can calculate the amount of precipitation based on a percentage of pixels within the images containing precipitation. Thus, the measure of the moving items can be the average size of the moving items, a maximum size of the moving items, and/or the average rate of movement of the moving items.

The computerized device also performs a continuously variable image correction process to remove precipitation from the series of images to produce a series of corrected images. This "continuously variable image correction" increases the amount of image correction for a relatively higher amount of precipitation and decreases the amount of image correction for a relatively lower amount of precipitation, and does so continuously as the amount of precipitation changes within the series of images. More specifically, the computerized device increases and decreases the amount of image correction in incremental or continuously variable amounts corresponding to changes in the amount of precipitation. Such "incremental amounts" of change in image correction are between fully on and fully off, and are therefore in addition to, and in between, maximum and minimum amounts of the image correction. Further, decreasing the amount of image correction requires less computing resources of the computerized device (relative to increasing the amount of image correction).

The computerized device then outputs the series of corrected images. The computerized device in this example can be located at a first location with the camera device. The computerized device can output the series of corrected images to a second computerized device over a computerized network, where the second computerized device is at a second location that is different than the first location.

The continuously variable image correction can be applied to only portions of the images. The amount of image correction for a current frame can depend on the amount of image correction used for a previous frame. The continuously variable image correction can be performed iteratively by repeating the process of calculating a measure of the moving items and performing the continuously variable image correction until the measure of the moving items in the corrected images is below a predetermined threshold. The continuously variable image correction can apply temporal median filtering, temporal order statistics filtering, temporal outlier rejection algorithms, temporal averaging, and temporal approximate median filtering. The system thus comprises an optical-based vehicle parking management system.

Exemplary generic methods herein receive a series of images into a computerized device. These methods compare at least two of the images in the series using the computerized device to locate items that are in different positions in different images (to identify moving items within the series of images). Such methods further calculate a measure (e.g., count the number, the amount, the percentage, etc.) of the moving items within the series of images using the computerized device. The measurement of the moving items can be, for example, a percentage of pixels within the series of images containing the moving items. These methods can also filter which moving items are counted by limiting the measurement to the moving items that are moving within a previously determined speed or size range.

Additionally, such methods perform a continuously variable image correction to remove the moving items from the series of images to produce a series of corrected images using the computerized device. This "continuously variable image correction" increases the amount of image correction for a relatively higher measure of the moving items and decreases the amount of image correction for a relatively lower measure of the moving items, and does so continuously as the measure of the moving items changes within the series of images. Thus, the amount of image correction increases and decreases in continuously variable amounts corresponding to changes in the measure of the moving items. Such "continuously variable amounts" are incremental changes in the amount of image correction performed that are addition to (and in between) maximum and minimum amounts of the image correction. Decreasing the amount of image correction requires less computing resources of the computerized device relative to increasing the amount of image correction.

These methods then output the series of corrected images from the computerized device. For example, the computerized device can output the series of corrected images to a second computerized device over a computerized network. The second computerized device can be at a second location different than the location of the camera and first computerized device.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
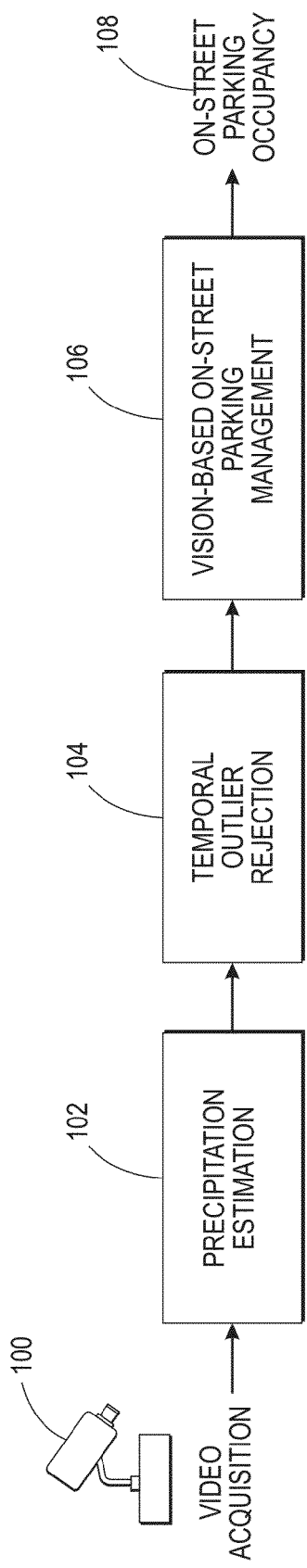
FIG. 1 is a flow diagram of various methods herein.

As mentioned above, performance of video-based parking management systems can be impacted by weather conditions, such as rain or snow. Therefore, the systems and methods herein provide additional modules for video-based parking management systems, such as a precipitation estimation module that determines the severity of rainfall or snowfall in the incoming video, and a temporal outlier rejection module that performs temporal filtering based on the measured severity of rainfall/snowfall to remove the effects of rain and snow. These modules provide significant performance improvement in rain/snow conditions, while minimizing computational load.

With the advent of computer vision and video processing technologies and the continually lowering cost of video cameras, video-based systems for transportation and surveillance applications have gained a great deal of attention in research, as well as industrial organizations. For these applications, many of them acquire/monitor outdoor scenes, where the quality of acquired video frames can be affected/degraded severely due to weather conditions such as rain or snow. This in turn can degrade the performance of these video-based systems under poor weather conditions.

Snowflakes can be detected via off-line machine learning and on-line classification techniques. Image portions corrupted by these detected snow-flakes can be either replaced with image content of background image constructed from past frames (this is referred to as temporal replacement) or image content of neighboring pixels of the same frame (this is referred to as in-paint replacement) based on addition analyses of motion. Finally, the current frame can be further enhanced with conventional image processing techniques. This improves video quality under poor weather condition for general surveillance applications without distorting moving objects (which are the main interest of many surveillance applications); however, the associated computation and complexity can be unnecessary for some applications, and can often be prohibitive for real-time applications.

Parking management systems that use video-based solutions are highly useful, and the systems and methods herein reduce computational overhead, yet still allow such systems to be robust against extreme weather such as snow and heavy rain. The methods and systems herein do not need complicated pre-processing steps discussed above for video-based parking management and thereby the methods and systems herein avoid the computation and complexity that may be unnecessary and prohibitive in many applications.

The discussion below and the accompanying drawings provide non-limiting examples that help illustrate how the systems and methods herein operate; however, those ordinarily skilled in the art would understand that such are merely examples, and that the systems and methods described herein are applicable to many other situations and are not limited to these specific (and sometimes oversimplified) examples.

FIG. 1 is a flow diagram showing one manner in which the systems and methods herein operate. In FIG. 1, item 100 represents a video acquisition module that includes a camera to captures video of the scene of interest and item 102 illustrates a precipitation estimation module that determines the severity of rainfall or snowfall in the incoming video. A temporal outlier rejection module that performs temporal filtering based on the measured severity of rainfall/snowfall to remove the effects of rain and snow falling is shown as item 104. Also, item 106 shows a vision-based parking management module that performs the task of parking assessment/management to determine parking occupancy 108, and item 106 operates on the video frames after rainfall/snowfall effects have been removed.

Figure 2:
FIG. 2 is an image processed by systems and methods herein.

FIG. 2 illustrates a sample video frame 120 of a street during a snowstorm. Note that in FIG. 2 (and FIG. 4, discussed below) a portion of the scene has been intentionally blurred to obscure the scene location and protect the privacy of any personal details within the images. The precipitation estimation module 102 determines the severity of rainfall or snowfall in the incoming images 120 (potentially from a video stream). The precipitation estimation module 102 provides guidelines and input parameters to the temporal outlier rejection module 104 so that it can effectively remove the negative impact of precipitation (e.g., snow, rain, etc.) on the performance of the vision-based parking module while keeping the computation level minimal.

When there is little to no precipitation, the systems and methods herein (through the precipitation estimation module 102 and the temporal outlier rejection module 104) perform minimal to no temporal outlier rejection to save unnecessary computational resources because the original video-based parking system 106 can perform acceptably on images having only light precipitation. However, as the precipitation gets heavier, higher temporal outlier rejection capability is used to improve the otherwise degraded performance of the original video-based parking system.

Thus, these systems and methods allot more computational resources when greater amounts of precipitation are present. Computational resources can be measured in many ways including the time needed to perform a computerized operation, the amount of memory used, the amount of power used, the amount of heat generated, etc. When more computational resources are used, computerized devices can operate slower, more memory can be utilized, more power can be used, more heat can be generated, etc. The methods and system herein continuously adjust the amount of correction performed based on the amount of interfering items in the images to minimize the amount of computation resources used (to provide faster operations, use less memory, consume less power, generate less heat, etc.).

Some examples herein can operate well with only coarse scales for input parameters supplied to the temporal outlier rejection module 104, which allows the precipitation estimation module 102 to consume less computational resources. In one example, the amount of precipitation can be determined by calculating the percentage area (in pixels) of raindrops/snowflakes to the total number of pixels of a frame. Here, the total area of raindrops/snowflakes can be measured as the sum of all motion items (e.g., "blobs") within a predetermined size range (typically greater than a few pixels, while much less than the size of a typical vehicle in the images). This is equivalent to an estimate of the total percent area of pixels covered by the potential snowflakes. This approach is simple, fast, and the motion analyses can be re-used in the vision-based parking module. Hence, the only overhead computation needed is to sum those blobs within a predetermined size range.

Other alternatives for precipitation estimation performed by the precipitation estimation module 102 include tracking screen motion blobs based on motion directions and colors before computing the sum of interfering items. This can use off-line machine learning and on-line classification for snowflakes, rain, leaves, etc. These alternatives may yield better accuracy of precipitation estimation, but are more complicated and more computationally expensive methods for this module, and are omitted in some instances.

Yet another set of alternatives for precipitation estimation performed by the precipitation estimation module 102 use machine-learning approaches that coarsely classify a frame into one of a few rough categories such as normal, rainy, severe rain, snow, and severe snow, etc. This can be done fairly efficiently once initial training is completed. Since the input parameters for outlier rejection module 104 can be quite coarse, this approaches is sufficient as well.

Figure 3:
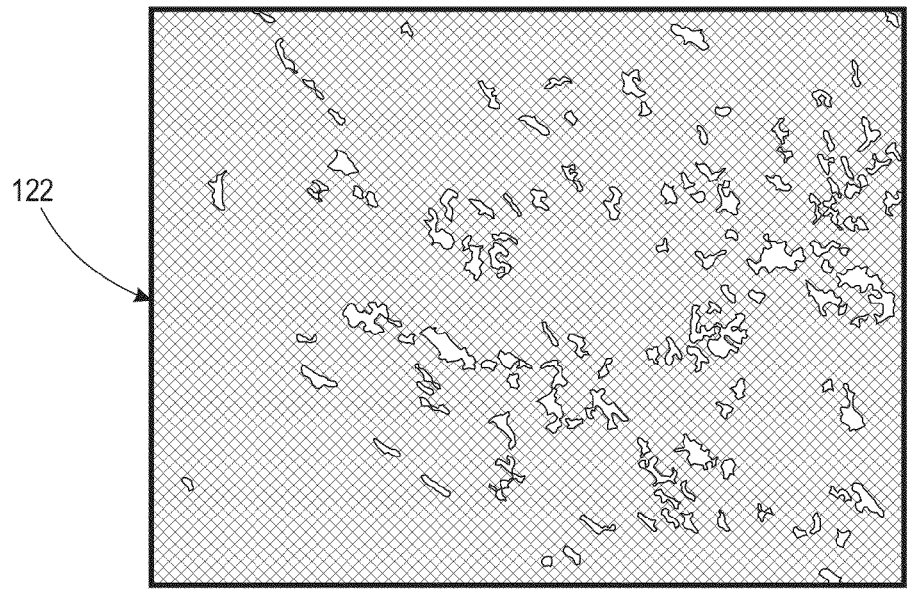
FIG. 3 is an image processed by systems and methods herein.

FIG. 3 illustrates an image 122 of the interfering items (e.g., snow, rain, leaves, insects, smoke trails, etc.) that are found that need to be removed using the temporal outlier rejection module 104. More specifically, the temporal outlier rejection module 104 performs temporal filtering based on the measured severity of rainfall/snowfall to remove the effects of rain and snow falling (such as that shown in item 122 in FIG. 3).

Systems and methods herein can, for example, use a temporal median filter with N-tap for temporal outlier rejection, where N is a monotonic function of p (the estimated precipitation). At any given pixel location, the chance of rainfall or snowfall visiting this location is lower than the chance of seeing the background scene. This assumption is reasonable, but it causes a problem for most video-based surveillance applications that need to monitor moving items, but this is not the case for systems that monitor non-moving or slow-moving, fixed position objects, such as parked vehicles for parking systems.

By applying such temporal outlier filtering to the video frames, relatively fast moving objects (e.g. vehicles traveling on the street) will also inevitably be removed. It is not possible to find a N (or a set of N's) that will filter out snowflakes while keeping moving vehicles (which can travel at all kinds of speed) on the street intact. Fortunately, parking management is not interested in such relatively fast moving vehicles (transient) but is interested in those vehicles that stay for a longer period (though not persistently day after day like the true background of the scene). It is this characteristic that allows systems and methods herein to find the middle ground temporal scale that is mostly relevant to parking and use this nature to solve rainfall/snowfall issues.

Figure 4:
FIG. 4 is an image processed by systems and methods herein.

FIG. 4 illustrates an image 124 after snowflake removal by the temporal outlier rejection module 104 on the video frames shown in FIG. 2. Thus, FIG. 4 shows the resulting video frame after applying temporal median filtering with N=15 (correspond to 3 sec. in the acquired 5 frame per second video) for snow removal on the frame shown in FIG. 2. Time stamps may by inadvertently removed by this median filtering process; however, systems and methods can replace the appropriate time stamp, when necessary.

Other alternative temporal outlier rejection techniques performed by the temporal outlier rejection module 104 include high order statistics filtering, running averages with outlier removal (e.g., trim mean based on percentile or average plus standard deviation) and approximate median filtering.

The vision-based parking management module 106 performs the task of parking assessment/management by operating on the rainfall/snowfall removed video frames. The precipitation estimation module 102 (described by p) and temporal outlier rejection module 104 (described by N) serve as video pre-processors for the video-based parking management system 106.

The calculation of p is very computer-resource inexpensive as discussed above. During a typical fair-weather period (corresponding to small p), the temporal outlier rejection module 104 is not activated (thus no additional cost of computation). As the weather conditions get worse (larger p), more temporal filtering (larger N) is applied to provide better video.

Figure 5:
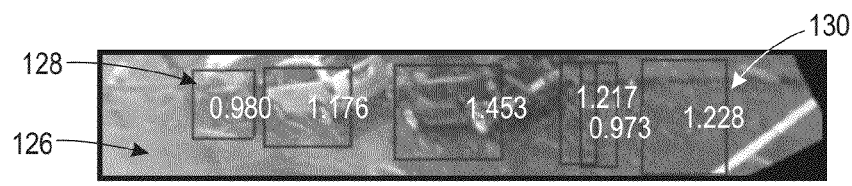
FIG. 5 is an image processed by systems and methods herein.
Figure 6:
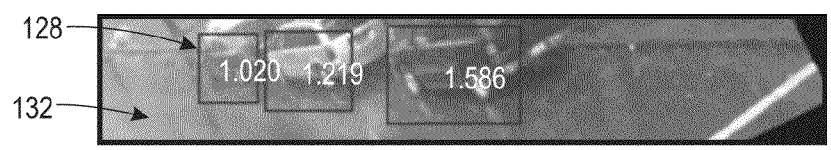
FIG. 6 is an image processed by systems and methods herein.

FIGS. 5 and 6 and illustrate rotated and cropped images around street parking area from FIG. 2 and FIG. 4, respectively. The portion of the images that is cropped is sometimes referred to as the region-of-interest (ROI).

FIG. 5 illustrates an image 126 showing vehicle detection results of the video-based parking management system 106 when the temporal outlier rejection module 104 does not remove the precipitation 122, but instead just performs operations on the original frame 120. As can be seen in FIG. 5, true positive vehicles 128 and false positive vehicles 130 are identified by the video-based parking management system 106.

To the contrary, in FIG. 6 image 132 shows vehicle detection results of the video-based parking management system 106 when the temporal outlier rejection module 104 removes the precipitation 122, and performs operations on the corrected frame 124. As can be seen in FIG. 6, true positive vehicles 128 are identified and no false positive vehicles 130 are identified by the video-based parking management system 106.

In FIGS. 5 and 6, the blue boxes 128, 130 indicate where parked vehicles are detected and the number inside each box indicates a score (the higher the better) from a vehicle detector. As can be seen in FIG. 5, there are 3 additional false-positives 130 from the original frame and the false-positives can have higher scores than those of the true-positives 128. This is because the non-removed snowflakes not only degrade the score of the vehicle classifier when they partially occlude vehicles, but they also fool the vehicle classifier when the snowflakes occlude the street parking area. These issues are improved or resolved when the temporal outlier rejection module 104 removes the precipitation 122.

Since the region-of-interest for parking is significantly smaller than the field of view of the camera 100 and the computational cost of additional temporal outlier rejection can be expensive, the systems and methods herein can perform temporal outlier rejection only within the region-of-interest rather than over the entire frame to further reduce computational costs. This does not affect the performance of vision-based parking management module, though the modified videos look strange for viewing (no snowflakes at the region-of-interest but present elsewhere).

Figure 7:
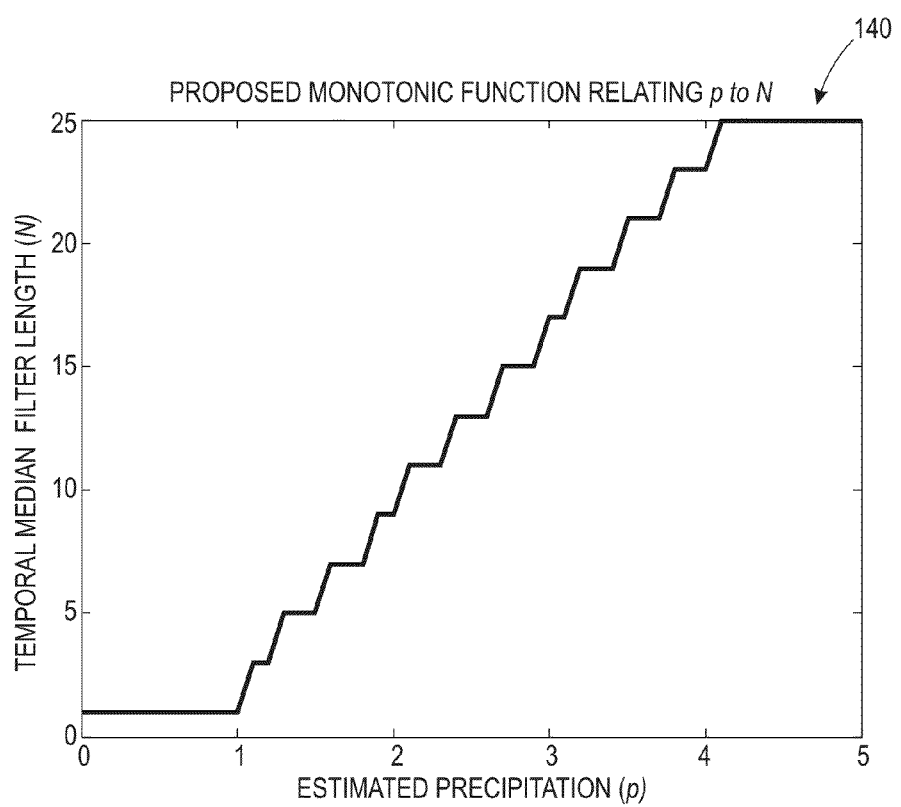
FIG. 7 is chart illustrating an exemplary monotonic function used by systems and methods herein.

FIG. 7 shows an example monotonic function 140 relating estimated precipitation p and median filter length N. The systems and methods herein use this exemplary function to adaptively select filter lengths for the snow-removal pre-processing. Those ordinarily skilled in the art would understand that FIG. 7 is just one example and that the systems and methods herein could be used with many other functions relating precipitation p and median filter length N that may vary from installation to installation.

Figure 8:
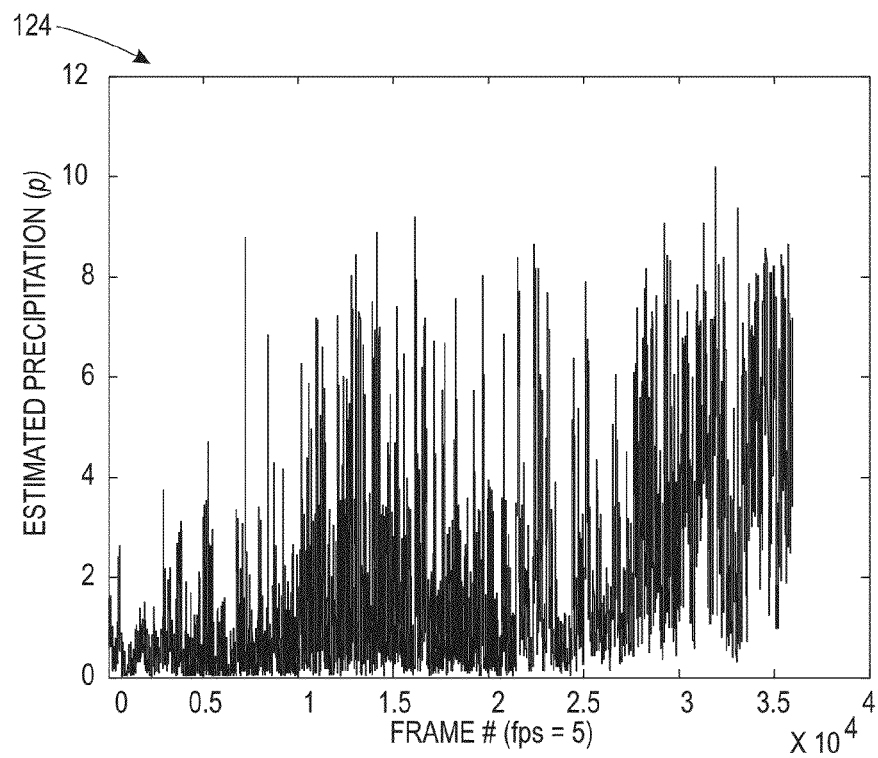
FIG. 8 is chart illustrating an exemplary precipitation measure produced by methods and systems herein.
Figure 9:
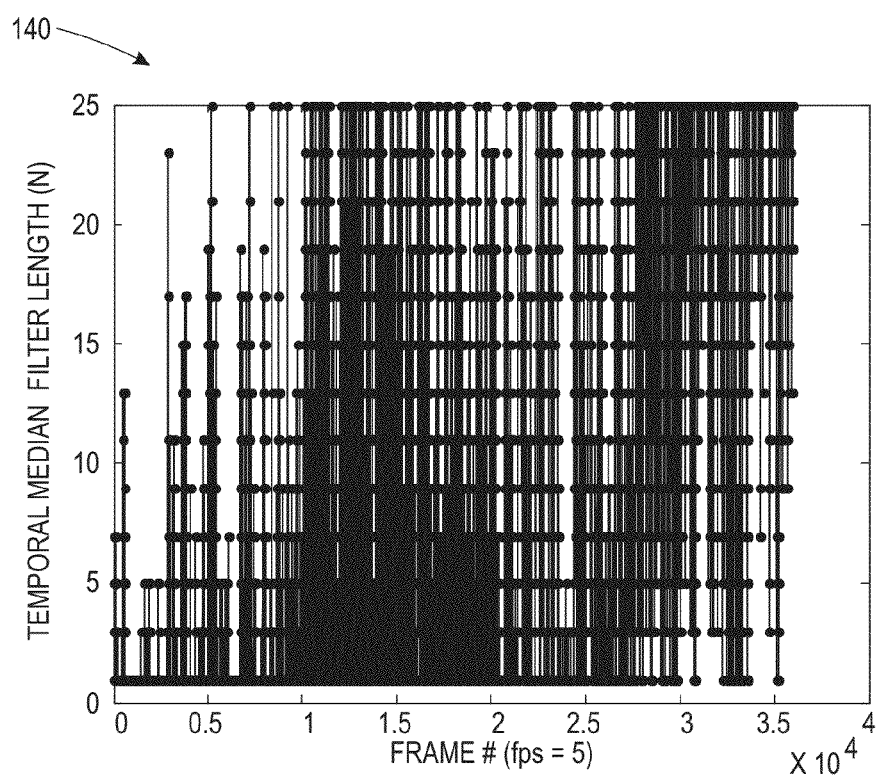
FIG. 9 is chart illustrating an exemplary amount of image correction made by methods and systems herein.

FIG. 8 shows a precipitation measure of an exemplary video produced by the precipitation estimation module 102 over a time period. As shown in FIG. 8, the severity of the snowfall varies fairly quickly frame-to-frame, but starts out small and gets more severe once it passes a certain amount of time. FIG. 9 illustrates the corresponding amount of image correction (e.g., N value) that is continuously changed by the temporal outlier rejection module 104 (e.g., the filter length) for each frame of the video.

The methods and system herein can perform the precipitation estimation and temporal outlier rejection in one iteration by defining a static (fixed) function relating p and N, or an iterative process can be applied as well. In one example, at iteration i the remaining precipitation p (i) of a (original or modified) frame is first estimated by the precipitation estimation module 102 to determine the input parameters for temporal outlier rejection module 104 with N (i)-tap. The frame is then modified by temporal outlier rejection module 104 with N (i)-tap. The modified frame is then re-assessed by precipitation estimation module 102 to get a new p(i+1) and thus determine a new N(i+1). The process continues until p is sufficiently small. Thus, instead of using a fixed function relating p and N for all videos, the methods and systems herein start with a rough estimate of N (typically smaller than would be used with a fixed function), modify the frame, check if the detected snowflakes are adequately reduced (to zero or some other predetermined precipitation measure) and, if not, increase N a predetermined step amount (or a variable step amount that is dependent upon the inadequacy of the most recent precipitation measure) and check again and repeat this process until precipitation is adequately reduced. This alternative is more adaptive but may not be necessary in some installations and could be more computationally expensive and therefore can be limited by systems and methods herein.

The methods and system herein hold N frames from a video feed in memory to perform temporal median filtering on multiple video frames. This consumes memory, network bandwidth resources, and processor time of real-time processing systems, especially in installations where the pre-processing is performed after the video/video frame has been transferred over a network to a central processor. In order to mitigate this effect, with systems and methods herein, the pre-processing can be implemented in hardware or software inside parking video acquisition modules 100 that contain the camera. Thus, the precipitation estimation module 102 and the temporal outlier rejection module 104 (and a conventional frame rate reduction module) can be physically located in the video acquisition module 100 that is physically present at the parking location to enable real-time processing at the parking location (and before any network transmissions or other intra-device communications are made). This allows systems and methods herein to reduce the number and size of items transmitted over networks, thereby reducing the amount of memory, bandwidth, and processor time utilized.

Median filtering is used as a robust background estimator for video processing and then the foreground is determined by the subtraction of current frame to the background. In one example, the process can have two temporal scales: a fairly steady background; and everything else. In this case, both moving vehicles and snowflakes would be considered as foreground. As a result, additional processing would be needed to remove snowflakes, which would inevitably degrade video frame quality unless complicated methods are applied.

In the case of parking, there is an intermediate temporal scale for parked vehicles. That is, there are three temporal scales (a fairly steady background, an intermediately steady parked vehicle, and the fast moving vehicles or raindrops/snowflakes). When there are no snowflakes, traditional paradigms work well with existing processing since a fast moving vehicle may temporally occlude a parked vehicle on the street but the occlusion does not persist over a long period of time or degrade the image quality of a parked vehicle, which would make vision-based vehicle detection harder. When there are snowflakes, an additional layer of median filter is applied to the video to remove the third temporal scale and thus return the modified video back to two temporal scales where traditional paradigms can work again.

This additional layer of median filtering (or secondary background estimation) adds computational cost, which may not be desired in certain installations. Thus, the systems and methods herein use a fairly low cost precipitation estimation module to ensure that only the necessary level of increase of computation is added.

When a larger N is applied, more image frames are stored in memory, more frames are analyzed, more pixels are processed, more iterations of precipitation estimation are performed, etc., which increases the amount of computing resources utilized. When one N setting for the temporal outlier rejection module 104 is selected for all times when any precipitation is present, this N setting is a compromise that balances the competing goals of high quality image correction and conservation of computing resources. Therefore, a single rejection setting (N) for the temporal outlier rejection module 104 does not provide the maximum achievable image correction (because setting N at a maximum level of correction would have a computationally excessive cost); and instead for systems that must use a single rejection setting, the setting is a mid-level rejection or correction setting that achieves a desired image quality and computing resource usage balance.

While the systems and methods herein could simply use a single measure for N that will work best on average for all forms and amounts of precipitation, the systems and methods herein instead gradually and continuously increase or decrease image correction as the measure of items that interfere with the captured video increases or decreases. Instead of just turning precipitation-based image correction fully "on" or fully "off" using a single pre-set measure of image correction (that is a compromised value between computational costs and clear images) the systems and methods herein continually increase or decrease image correction between fully off and fully on to save computing power, yet provide the best image correction needed for each different situation.

Further, by being able to continually change the amount of image correction that is performed, the systems and methods herein can use the maximum image correction capabilities of a given system (which would use an excessive amount of computational resources) only when necessitated by excessive precipitation. A single image correction setting would preferably not be set for the maximum image correction capabilities of a given system, because doing so would make the system highly inefficient. Therefore, systems and methods herein provide a higher level of correction above the compromised correction level that might work best on average if a single correction value were used. The systems and methods herein improve image correction performance at the expense of increasing computation, but do so only when the precipitation estimation indicates that such increased image correction is necessary.

Figure 10:
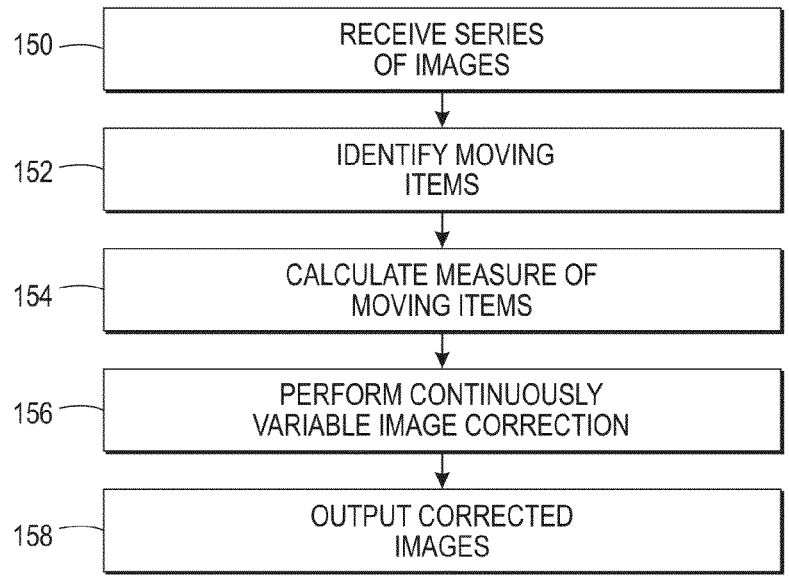
FIG. 10 is a flow diagram of various methods herein.

FIG. 10 is flowchart illustrating exemplary methods herein. In item 150, these methods receive a series of images into a computerized device. These methods compare at least two of the images in the series using the computerized device to locate items that are in different positions in different images (to identify moving items within the series of images) in item 152. Such methods further calculate a measure (e.g., count the number, the amount, the percentage, etc.) of the moving items within the series of images using the computerized device in item 154. The measurement of the moving items can be, for example, a percentage of pixels within the series of images containing the moving items. These methods can also filter which moving items are counted by limiting the measurement to the moving items that are moving within a previously determined speed or size range.

Additionally, such methods perform a continuously variable image correction to remove the moving items from the series of images to produce a series of corrected images using the computerized device in item 156. This "continuously variable image correction" increases the amount of image correction for a relatively higher measure of the moving items and decreases the amount of image correction for a relatively lower measure of the moving items, and does so continuously as the measure of the moving items changes within the series of images. Thus, the amount of image correction increases and decreases in continuously variable amounts corresponding to changes in the measure of the moving items. Such "continuously variable amounts" are incremental changes in the amount of image correction performed that are addition to (and in between) maximum and minimum amounts of the image correction. Decreasing the amount of image correction requires less computing resources of the computerized device relative to increasing the amount of image correction.

These methods then output the series of corrected images from the computerized device in item 158. For example, the computerized device can output the series of corrected images to a second computerized device over a computerized network. The second computerized device can be at a second location different than the location of the camera and first computerized device.

Figure 11:
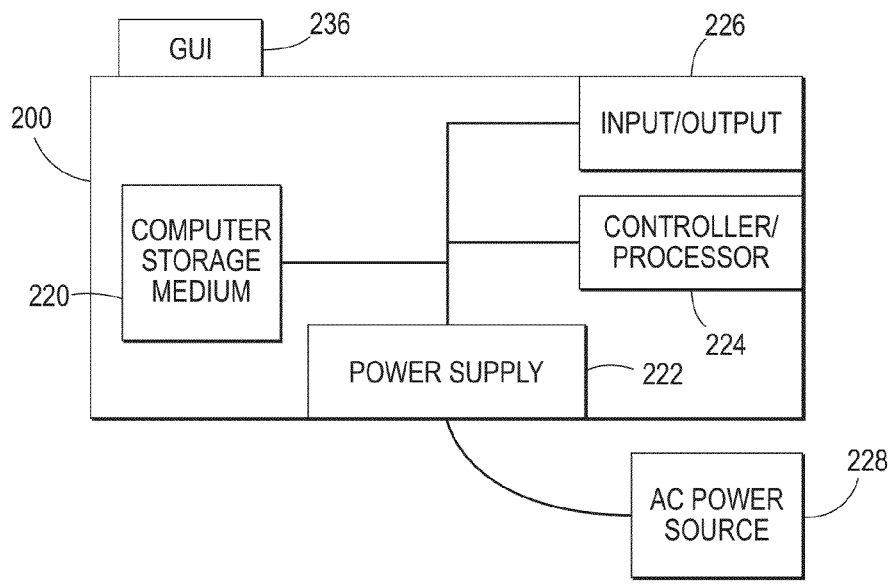
FIG. 11 is a schematic diagram illustrating devices herein.

FIG. 11 illustrates a computerized device 200, which can be used with systems and methods herein and can comprise, for example, a server, a personal computer, a portable computing device, a camera-based remote optical device, etc. The computerized device 200 includes a controller/processor 224 and a communications port (input/output) 226 operatively connected to the processor 224 and to the computerized network external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 11, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

In addition, some of the computerized devices 200 herein can include optical detection devices 210, such as cameras, etc. Such a camera device 210 acquires a series of images and the processor 224, that is operatively (meaning directly or indirectly) connected to the camera device, compares at least two different images in the series of images to locate items that are in different positions in the different images to identify precipitation within the series of images, and to locate items that are in the same position in the images (to, for example, identify parked vehicles). For example, the processor 224 can limit the calculation of the amount of precipitation to items that are moving within a previously determined speed range. The processor 224 then calculates the amount of precipitation within the series of images. For example, the processor 224 can calculate the amount of precipitation based on a percentage of pixels within the images containing precipitation.

The processor 224 also performs a continuously variable image correction process to remove precipitation from the series of images to produce a series of corrected images. This "continuously variable image correction" increases the amount of image correction for a relatively higher amount of precipitation and decreases the amount of image correction for a relatively lower amount of precipitation, and does so continuously as the amount of precipitation changes within the series of images. More specifically, the processor 224 increases and decreases the amount of image correction in incremental or continuously variable amounts corresponding to changes in the amount of precipitation. Such "incremental amounts" of change in image correction are between fully on and fully off, and are therefore in addition to, and in between, maximum and minimum amounts of the image correction. Further, decreasing the amount of image correction requires less computing resources of the processor 224 (relative to increasing the amount of image correction).

The processor 224 then outputs the series of corrected images. As shown in FIG. 11, the processor 224 in this example can be located at a first location with the camera device. The processor 224 can output the series of corrected images to a second computing device 200 over a computerized network, where the second computing device 200 is at a second location that is different than the first location.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

A "pixel" refers to the smallest segment into which an image can be divided. Received pixels of an input image are associated with a color value defined in terms of a color space, such as color, intensity, lightness, brightness, or some mathematical transformation thereof.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like. Also, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A system comprising:
   a camera device acquiring a series of images; and
   a computerized device operatively connected to said camera device,
   said computerized device comparing at least two images in said series of images to locate items that are in different positions in said at least two images to identify moving items within said series of images,
   said computerized device calculating a measure of said moving items,
   said computerized device performing a continuously variable image correction to remove said moving items from said series of images to produce a series of corrected images,
   said continuously variable image correction increasing an amount of image correction for a relatively higher measure of said moving items and decreasing said amount of image correction for a relatively lower measure of said moving items continuously as said measure of said moving items changes within said series of images,
   said continuously variable image correction increasing and decreasing said amount of image correction in continuously variable amounts corresponding to changes in said measure of said moving items,
   said continuously variable amounts being between predetermined maximum and minimum amounts of said image correction, and
   said computerized device outputting said series of corrected images.

2. The system according to claim 1, said continuously variable image correction being applied to only portions of said images.

3. The system according to claim 1, said amount of image correction for a current frame further depending on said amount of image correction used for a previous frame.

4. The system according to claim 1, said continuously variable image correction being performed iteratively by repeating said calculating a measure of said moving items and performing said continuously variable image correction until said measure of said moving items in said corrected images is below a predetermined threshold.

5. The system according to claim 1, said continuously variable image correction comprising applying one of: temporal median filtering, temporal order statistics filtering, temporal outlier rejection algorithms, temporal averaging, and temporal approximate median filtering.

6. The system according to claim 1, said system comprising an optical-based vehicle parking management system.

7. The system according to claim 1, said moving items comprising one of raindrops and snowflakes.

8. The system according to claim 1, said measure of said moving items comprising at least one of: an average size of said moving items; a maximum size of said moving items; and an average rate of movement of said moving items.

9. A system comprising:
   a camera device acquiring a series of images; and
   a computerized device operatively connected to said camera device,
   said computerized device comparing at least two images in said series of images to locate items that are in different positions in said at least two images to identify moving items within said series of images,
   said computerized device calculating a measure of said moving items,
   said computerized device performing a continuously variable image correction to remove said moving items from said series of images to produce a series of corrected images,
   said continuously variable image correction increasing an amount of image correction for a relatively higher measure of said moving items and decreasing said amount of image correction for a relatively lower measure of said moving items continuously as said measure of said moving items changes within said series of images,
   said continuously variable image correction increasing and decreasing said amount of image correction in continuously variable amounts corresponding to changes in said measure of said moving items,
   said continuously variable amounts being between predetermined maximum and minimum amounts of said image correction,
   said computerized device being located at a first location with said camera device,
   said computerized device outputting said series of corrected images to a second computerized device over a computerized network, and
   said second computerized device being at a second location different than said first location.

10. A method comprising:
    receiving a series of images into a computerized device,
    comparing at least two images in said series of images using said computerized device to locate items that are in different positions in said at least two images to identify moving items within said series of images;
    calculating a measure of said moving items using said computerized device;
    performing a continuously variable image correction to remove said moving items from said series of images to produce a series of corrected images using said computerized device, said continuously variable image correction increasing an amount of image correction for a relatively higher measure of said moving items and decreasing said amount of image correction for a relatively lower measure of said moving items continuously as said measure of said moving items changes within said series of images, said continuously variable image correction increasing and decreasing said amount of image correction in continuously variable amounts corresponding to changes in said measure of said moving items, and said continuously variable amounts being between predetermined maximum and minimum amounts of said image correction; and outputting said series of corrected images from said computerized device.

11. The method according to claim 10, said continuously variable image correction being applied to only portions of said images.

12. The method according to claim 10, said amount of image correction for a current frame further depending on said amount of image correction used for a previous frame.

13. The method according to claim 10, said continuously variable image correction being performed iteratively by repeating said calculating a measure of said moving items and performing said continuously variable image correction until said measure of said moving items in said corrected images is below a predetermined threshold.

14. The method according to claim 10, said continuously variable image correction comprising applying one of: temporal median filtering, temporal order statistics filtering, temporal outlier rejection algorithms, temporal averaging, and temporal approximate median filtering.

15. The method according to claim 10, said method comprising an optical-based vehicle parking management method.

16. The method according to claim 10, said moving items comprising one of raindrops and snowflakes.

17. The method according to claim 10, said measure of said moving items comprising at least one of: an average size of said moving items; a maximum size of said moving items; and an average rate of movement of said moving items.

18. A method comprising:

receiving a series of images into a computerized device, comparing at least two images in said series of images using said computerized device to locate items that are in different positions in said at least two images to identify moving items within said series of images;

calculating a measure of said moving items using said computerized device;

performing a continuously variable image correction to remove said moving items from said series of images to produce a series of corrected images using said computerized device, said continuously variable image correction increasing an amount of image correction for a relatively higher measure of said moving items and decreasing said amount of image correction for a relatively lower measure of said moving items continuously as said measure of said moving items changes within said series of images, said continuously variable image correction increasing and decreasing said amount of image correction in continuously variable amounts corresponding to changes in said measure of said moving items, and said continuously variable amounts being between predetermined maximum and minimum amounts of said image correction; and outputting said series of corrected images from said computerized device, said computerized device being located at a first location with a camera device, said computerized device outputting said series of corrected images to a second computerized device over a computerized network, and said second computerized device being at a second location different than said first location.

* * * * *